US009832850B2

(12) United States Patent
Clemen, Jr. et al.

(10) Patent No.: US 9,832,850 B2
(45) Date of Patent: Nov. 28, 2017

(54) APPARATUSES, METHODS AND SYSTEMS FOR ACTIVE COUNTER DIRECTED ENERGY PLATFORM PROTECTION (71) Applicant: The Boeing Company, Seal Beach, CA (US)

(72) Inventors: Mark J. Clemen, Jr., Bremerton, WA (US); Alan F. Stewart, Seattle, WA (US); John R. Hull, Sammamish, WA (US); Keith J. Davis, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1104 days.

(21) Appl. No.: 13/932,650

(22) Filed: Jul. 1, 2013

(65) Prior Publication Data
US 2016/0165706 A1 Jun. 9, 2016

(51) Int. Cl.
H05F 3/00 (2006.01)
H05F 7/00 (2006.01)
B64D 45/02 (2006.01)
B60R 13/08 (2006.01)
B32B 5/16 (2006.01)
B32B 7/12 (2006.01)
B32B 27/40 (2006.01)

(52) U.S. Cl.
CPC .............. H05F 7/00 (2013.01); B32B 5/16 (2013.01); B32B 7/12 (2013.01); B32B 27/40 (2013.01); B60R 13/08 (2013.01); B64D 45/02 (2013.01); B32B 2264/105 (2013.01); B32B 2307/204 (2013.01); B32B 2307/212 (2013.01); B32B 2307/416 (2013.01); B32B 2307/732 (2013.01); B32B 2457/10 (2013.01); B32B 2571/00 (2013.01); B32B 2605/18 (2013.01); Y02T 50/53 (2013.01)

(58) Field of Classification Search
CPC ............ B64D 45/02; B60R 13/08; H05F 7/00
USPC .................................................. 361/218, 212
See application file for complete search history.

(56) References Cited

U.S. PATENT DOCUMENTS

| 6,177,189 | B1 | 1/2001 | Rawlings et al. | |
| 7,223,959 | B2 * | 5/2007 | Fuller | G21F 1/10 250/216 |
| 7,869,181 | B2 | 1/2011 | Le | |
| 2003/0152766 | A1 * | 8/2003 | Vargo | B32B 7/12 428/343 |
| 2006/0051592 | A1 * | 3/2006 | Rawlings | B32B 15/08 428/423.1 |
| 2008/0142238 | A1 * | 6/2008 | Rawlings | B64D 45/02 174/2 |
| 2010/0134945 | A1 | 6/2010 | Rawlings et al. | |
| 2012/0182052 | A1 * | 7/2012 | Lorenzo Pena | G01D 3/036 327/113 |

* cited by examiner

Primary Examiner — Thienvu Tran
Assistant Examiner — Lucy Thomas
(74) Attorney, Agent, or Firm — Coats & Bennett, PLLC (57) ABSTRACT The present disclosure relates to the active initiation of incident energy-dissipating material from a structure surface coating as a counter measure response for the protection of a structure surface. The active initiation is triggered at a predetermined area or areas on a targeted structure surface in response to incident directed energy sensed on a target surface.

18 Claims, 9 Drawing Sheets

APPARATUSES, METHODS AND SYSTEMS FOR ACTIVE COUNTER DIRECTED ENERGY PLATFORM PROTECTION

TECHNOLOGICAL FIELD

The present disclosure relates generally to the field of ablative materials and layers applied to a material surface. More specifically, the present disclosure relates to apparatuses, methods and systems for sensing directed incident energy on a substrate surface and substantially simultaneously selectively activating counter-directed energy protection of a substrate surface.

BACKGROUND

The use of certain types of ablative layers on surfaces is known for the purpose of dissipating electrical lightning strikes and for heat dissipation. In spacecraft design, ablation is used to both cool and protect mechanical parts that would otherwise be damaged by extremely high temperatures. For example, ablative layers on structures such as heat shields and rocket engine nozzles are designed to detach from a surface for the purpose of directing heat away from a surface exposed to heat stress. In such uses, the ablative surface is exposed to significant heat. When a critical temperature is reached, the reactive ablative material reaches its sublimation temperature and "explodes" away from the surface. In essence, ablative material is therefore designed to slowly burn away in a controlled manner, so that heat can be carried away (and therefore dissipated from the spacecraft surface) by the gases generated by the ablative process, while the remaining solid material insulates the craft from superheated gases.

Material ablation at high power densities is a complex combination of processes. To protect the underlying structure, ablative materials have been selected to be thermal insulators. However, known ablative materials have experienced localized heat deposition on the surface that builds up faster than the heat can be directed away from the surface. As a result, the surface temperature rises rapidly and leads to thermal degradation of the surface. Organic components then vaporize, leaving behind a charred surface. This can lead to the melting or vaporizing of underlying structural layers and fibers that become exposed. Further, pockets of hot gas may lead to micro-explosions, fracturing and rapid failure.

BRIEF SUMMARY

The present disclosure relates to methods for protecting a structure against damage from incident directed energy, the structure surface comprising a coating and at least one enclosure, the coating comprising a sensing layer, and the enclosure further comprising a contained amount of an incident energy-dissipating material. The enclosure is in communication with the sensing layer and a triggering mechanism, with the method comprising the steps of: locating the coating at predetermined locations on the structure surface; locating the enclosure at predetermined locations on the structure surface; sensing incident directed energy at the sensing layer; and activating the triggering mechanism, said triggering mechanism activating the incident energy-dissipating material in the enclosure at predetermined locations on the structure surface.

The enclosure is preferably an applique or a container. The coating itself is preferably applied to the structure surface as an applique, and may comprise the sensing layer, the triggering mechanism, and the enclosure containing incident energy-dissipating material. The coating may further comprise a top coat layer. The enclosure may therefore be a layer in the coating, and the enclosure may further comprise layers including a reflective layer, a base layer, an adhesive layer and combinations thereof. The incident energy-dissipating material preferably comprises components that are dimensioned to at least partially dissipate incident directed energy wavelengths, and include materials such as nano-particles, non-nano particles, ablative particles, and combinations thereof. At least a portion of the enclosure releases from the structure surface, and the enclosures may be located remotely from a point of sensed incident energy on a structure surface. Preferred structure surfaces include vehicles, aircraft and stationary structures.

According to preferred aspects, incident directed energy is sensed by the sensing layer, and incident energy-dissipating material located within at least one enclosure at predetermined locations is activated by triggering mechanisms in communication with the sensing layer and the incident energy-dissipating material. Predetermined amounts of incident energy-dissipating material is then substantially simultaneously released from the enclosure.

The present disclosure further relates to systems for protecting a structure against damage from incident directed energy having at least one wavelength, the structure comprising a coating applied to predetermined locations on a substrate surface. The coating preferably comprises a sensing layer, having at least one sensor, and at least one enclosure containing an amount of incident energy-dissipating material in the enclosure. The enclosures are preferably in communication with the sensing layer, and are located at predetermined locations on the structure surface. A triggering mechanism is in communication with the sensor and the enclosure, and activates the incident energy-dissipating material within the enclosure at predetermined locations on the structure surface. The material is then released from the enclosure.

Still further, the present disclosure contemplates coatings for protecting a structure against damage from incident directed energy preferably comprising a base layer comprising an adhesive layer, at least one reactive layer comprising incident energy-dissipating particles, a reflective layer preferably disposed between the base layer and the reactive layer, and a sensing layer for sensing incident directed energy. Preferably the sensing layer is in communication with the reactive layer, and the sensing layer comprises at least one sensor in communication with a triggering mechanism for activating the reactive layer. The coating is preferably applied to a structure surface as an applique, and may further comprises a top coat layer. The reactive layer preferably includes a nano-thermite-containing compound, and an optional reflective layer preferably comprises a metal including aluminum, silver and combinations thereof. The incident energy-dissipating material preferably comprises materials selected from the group including nano-particles, non-nano-particles, ablative particles, and combinations thereof. The coating preferably has an average thickness ranging from about 0.01 µm to about 5,000 µm.

According to preferred aspects, the coatings of the present disclosure may be designed to substantially match the existing appearance of the structure surface on which the applique is applied. Preferably, the coatings comprise a top coat layer to substantially match the existing properties of the structure surface on which the applique is applied, in terms of visual appearance and other properties and characteristics. The coating further comprises layers providing protection from the environment and substantially, though at times incompletely, encapsulates the underlying reactive and ablative layers. The top coat layer preferably comprises compounds and materials including typical vehicle paints, vehicle surface finishes, various transparent polymeric compounds, etc. More specifically, the preferred top coat layer comprises materials including epoxy resin or resins, an acrylic mix, etc. and combinations thereof. Preferred top coat layer materials may comprise dopants. Such useful dopants include, for example, carbon.

The reactive layer preferably comprises a thermite-containing compound, preferably a nano-thermite-containing compound e.g., an oxidizer, such as, for example, a perchlorate, an azide, a peroxide, etc., any metal nano-particles e.g., iron-containing, titanium-containing, aluminum-containing particles etc., and combinations thereof. The reflective layer may comprise metallic compounds and metals e.g., gold, indium, silver, aluminum, titanium-nitride, titanium carbide, etc., and combinations thereof. The reflective layer could be a non-metal, such as, for example, a multi-layer interference or dielectric stack of polymers. The reflective layer could also comprise e.g., selenium, tellurides, etc., and combinations thereof.

The incident energy-dissipating layer preferably comprises nano-particle, micro-particle and macro-particle compounds such as, for example, corner cube reflectors, flat reflectors such as graphene sheets, nano-particle-laden dust, such as, for example, those comprising molybdenum disulfides, etc.

According to the disclosure, the incident energy-dissipating material becomes exposed to the atmosphere, or is otherwise released from the coating, at times substantially simultaneously, once a sensor senses incident directed energy; with reaction times ranging from about 10 nsec to about 10 sec, and more preferably ranging from about 1 msec to about 100 msec (from the time the sensor senses incident directed energy at a structure surface until incident energy-dissipating material releases from the coating).

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

The present disclosure contemplates apparatuses, methods and systems for the responsive protection of a substrate against incident directed energy (such as, for example, lasers, etc.). According to a preferred aspect of the present disclosure, lightweight appliques are constructed and applied to a substrate surface to protect the surface from incident high energy sources, such as, for example, laser beams, lightning strikes, etc. The preferred appliques can be suitably tailored to meet specific requirements, and are preferably thought to complement coating systems. The preferred appliques are preferably designed to protect against incident energy and corrosion, while also preferably maintaining a desired outward appearance, and facilitating repair and replacement following incident energy strikes. Still further, according to one variation, the appliques comprise a sensing feature or layer in communication with a triggering mechanism that is in communication with the incident energy-dissipating material, or with mechanisms responsible for the predetermined release of incident energy-dissipating material.

A desirable incident energy-dissipating layer should substantially uniformly degrade. Energy incident upon the incident energy-dissipating layer is absorbed by a complex combination of de-polymerization, melting, vaporization, chemical decomposition, etc. Gases formed in under-layers should ideally be vented predictably to the surface. Accordingly, methods, systems and apparatuses are disclosed for the construction and application of a lightweight applique for aircraft structural protection that is able to sense and react actively to incident directed energy, e.g., from a directed energy attack, by deploying incident energy-dissipating materials from an incident energy-dissipating layer to form a particulate "screen", "cloud" or "shield". Preferably, the applique system performs as a subsystem capable of sensing, and then actively reacting, substantially simultaneously, to high power energy threats (e.g. having a power density ranging from about 10 W/cm$^2$ to about 10,000 W/cm$^2$ or greater).

According to preferred aspects, the present disclosure contemplates lightweight high power sensing layers comprising materials suitable for incorporation into an applique or other enclosure for use, for example, on aircraft, vehicles and stationary objects and structures. The energy absorption away from the surface is enhanced, as compared to known solutions, by increasing the speed that, for example, an opaque dust of particulate material may be formed at a predetermined distance above a surface; preferably a surface in motion, but is also able to protect stationary structures from damage. The release of the incident energy-dissipating dust-like material away from the surface is preferably predictably tailored to convert energy from a wavelength of an incident energy beam (e.g. a laser beam) to the emission of a second wavelength as a signal (therefore acting as a means of wireless communication) able to be sensed by the sensing layers of the present disclosure to achieve a further predetermined and predictable incident energy-dissipating material release from other areas, e.g., areas adjacent to a target region receiving the incident directed energy. According to one aspect, the incident energy-dissipating material is an ablative material preferably comprising ablative nano-particles.

According to a further aspect, the applique comprising the incident energy-dissipating layer comprises active electronic sensing technology to actively sense incident energy, in substantially real time, e.g., from a directed energy attack. The sensors or sensing layers preferably comprise active electronic sensors that are placed in communication with mechanisms responsible for activating the incident energy-dissipating material, and substantially simultaneously and predictably release amounts of incident energy-dissipating material from the applique affixed to a substrate surface. In addition, according to one aspect, the sensing layers also generate a notifying signal to a pilot, and/or other operator located remotely from the structure under high energy attack. The remotely located operator may be located in an airborne or ground-based command center. According to one aspect, the active electronic sensors are programmed to automatically activate the incident energy-dissipating materials in the incident energy-dissipating layers. In another aspect, the sensing layers generate a signal to an operator who selectively and actively activates a trigger mechanism to activate the incident energy-dissipating materials in the incident energy-dissipating layers. In this way, the incident energy-dissipating material is released from the applique and therefore from a substrate surface in the form of a predictably deployed screen or cloud of particulate material. As a result, the applique comprising the incident energy-dissipating material performs as a subsystem capable of sensing high power threats e.g., from an incident energy beam, and controlling a reaction to such threats. High power threats are understood to be those having a power density ranging from about 10 $W/cm^2$ to about 10,000 $W/cm^2$ or greater).

In addition, the use of appliques for housing an incident energy-dissipating subsystem facilitates repair of the vehicle or structure surface following a directed energy attack, as damage preferably occurs at the applique and not on the surface underlying the applique. As a result, an incident directed energy-impacted vehicle or structure can be repaired more quickly and easily following a directed energy attack, for example, by removing and replacing only the affected applique(s). The ability to protect an underlying structure surface during attack and also effect repair through applique replacement makes the apparatuses, methods and systems disclosed herein highly advantageous. In addition, according to further aspects, the appliques may comprise additional functionalities e.g., lightning strike protection, use as conformal antennae, as well as improving compliance with limits on the release of volatile organic compounds (VOCs) into an environment (which may otherwise occur with various paint coatings or composite material degradation, etc.).

One preferred aspect contemplates the manufacture and use of incident energy-dissipating appliques able to provide protection from a laser light source emitting at a wavelength ranging from about 0.5 to about 1.6 microns (assuming a power density approximately equal to CW 100 kW (continuous wave) beam disposed over a 100 $cm^2$ area). It is understood that absorption of this range of power density could cause significant damage to an unprotected surface. According to one aspect of the present disclosure, once the energy is detected by sensors, in or outside of the applique, a signal is sent from the sensors/sensing layer to automatically trigger the release of a preselected and predetermined amount of incident energy-dissipating material from layers of the applique. The incident energy-dissipating material releases from the affected area, such that the incident energy reacts with material that is no longer part of the targeted surface (e.g. vehicle surface or stationary structure surface). The intervening, released material provides multiple pathways for the incident energy to be dissipated and otherwise redirected away from the vehicle or structure surface. Stated another way, the use of incident energy-dissipating appliques comprising incident energy-dissipating materials that preferably release from the applique and away from the structure surface, provides a rapid transition (substantially simultaneously), such that the directed energy attack is directed from a structure's surface to a region of incident energy-dissipating material that is predictably directed a predetermined distance away from a structure's surface.

According to contemplated aspects, the appliques according to the present disclosure comprise a layered film. The base film layer of the applique is preferably designed to adhere to a substrate's surface to be protected, and preferably comprises an adhesive such as, for example, a pressure-sensitive adhesive (PSA) backing material.

The layers of the applique preferably comprise a top coat layer selected and designed not only for visual appearance, and an environmental barrier layer selected and designed to protect the incident energy-dissipating layers of the appliques, while being able to predictably and effectively allow for the sensing layer to substantially simultaneous activate the incident energy-dissipating material from the reactive material layer(s) of the applique (when the incident energy-dissipating layer(s) are triggered for activation). Therefore, according to preferred aspects, the applique layers provided between the top coat layer and the base film preferably comprise incident energy-dissipating material able to counter-direct, and therefore dissipate, a directed energy attack. In addition, according to further preferred aspects, a reflective layer is positioned between the base film layer and the layer(s) of reactive material. Reactive layers are preferably located proximate to the incident energy-dissipating material layers, or incorporated integrally with the incident energy-dissipating material layers, and are activated to react and effect the release of the incident energy-dissipating material.

One type of incident directed energy is the directed energy emitted from a laser. The laser protective function of the appliques, according to the present disclosure, is accomplished by including, in the applique, at least one incident energy-dissipating component layer that, upon the electronic sensors receiving intense laser irradiation (e.g. having a power density ranging from about 10 $W/cm^2$ to about 10,000 $W/cm^2$ or greater), a signal is sent to the ablative layers in the applique to substantially simultaneously release a particulate "cloud" or "screen" capable of deflecting the majority of the incident laser power away from the initially irradiated surface region. When material from an incident energy-dissipating layer is released from the applique, the applique preferably reveals a highly reflective layer left on the base film. The reflective layer further limits the absorption of any lingering incident directed energy remaining in the area and that may otherwise be directed to the substrate surface.

In addition, the present disclosure contemplates protecting structural components, especially aircraft structural components, from directed energy levels in excess of 10,000 W/cm$^2$, such as those encountered by lightning strikes. According to the present disclosure, the methods, systems and coatings disclosed herein can be implemented to dissipate and otherwise divert extremely high power incident energy encountered on a structural surface (e.g. an aircraft structural surface, etc.) by activating and deploying a particulate screen that may be converted to a plasma, preferably at a predetermined distance away from a structure's surface. When impacted by an incident lightning strike, the energy-dissipating material now exposed to high energy becomes a plasma that dissipates the incident energy (and heat), averting and otherwise significantly reducing the serious damage that would otherwise occur on the structural surface. According to one aspect, the incident energy-dissipating material is released by actively triggering the material. Lightning strike sensors detect and signal the imminent presence of a lightning strike. The signal may be sent to an on-board or remotely-located operator who then engages the system by triggering the release of the incident energy-dissipating material from coatings, appliques, canisters, etc. located at or near the area of anticipated impact on, for example, the aircraft structural surface. In another variation, the activation and deployment of the material occurs substantially simultaneously, with a signal sent from the lightning strike sensor directly to the incident energy-dissipating material to cause the required material release (with no operator action).

According to one aspect, the applique comprises integrally, or is in communication with, a triggering mechanism for triggering the release of particulates from the incident energy-dissipating layer(s). The release of material may occur, upstream or downstream from the region of incident directed energy impingement to further enhance the "screening effect" of the incident energy-dissipating material. That is, according to preferred aspects, once a threat is received and sensed by the active electronic sensors, signals are sent to a triggering mechanism that can release incident energy-dissipating material not only from the area directly impacted, but also from appliques affixed to surrounding regions of the structure (relative to the direct incident energy impact), e.g. depending on the intensity of the incident energy being sensed. The substantially simultaneous incident radiation sensing and signal generation results in the substantially simultaneous release of incident energy-dissipating material away from, for example, an aircraft coated with the appliques (in an amount determined by the intensity of the incident energy), is thought to afford a pilot the critical time necessary to effect evasive maneuvers to evade the directed energy attack, thus preventing sustained illumination of a particular surface.

Figure 1:
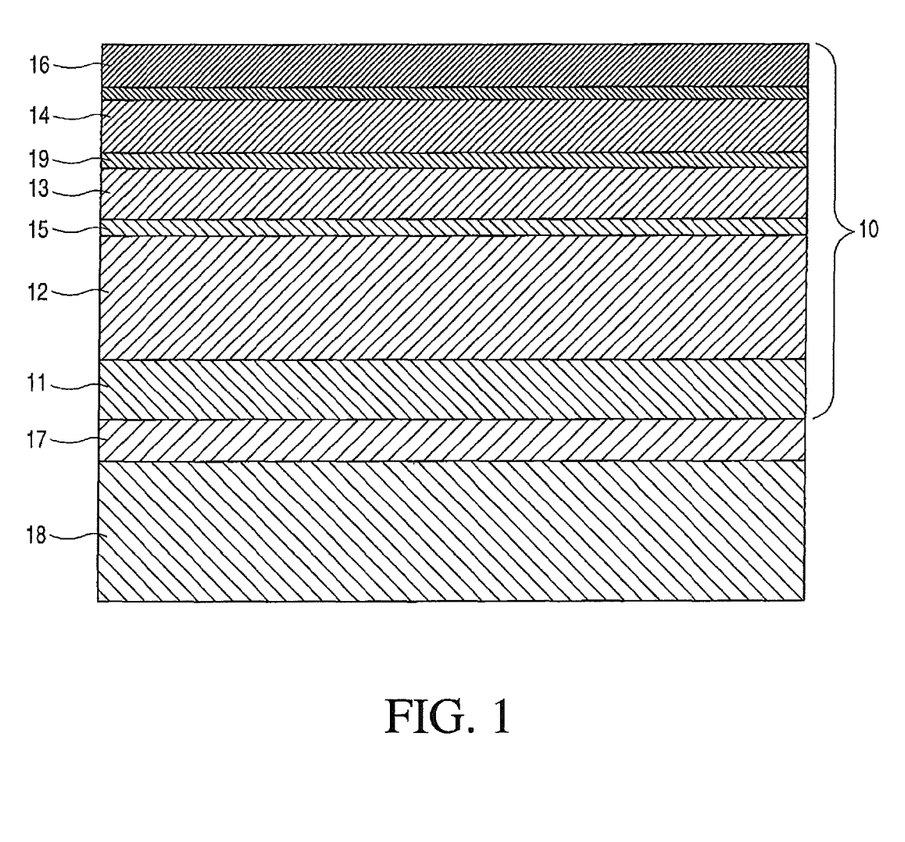
FIG. 1 is a schematic diagram showing the layers of an applique in one preferred variation, with the applique attached to an aircraft skin or structure.

FIG. 1 shows one preferred aspect with an applique 10 comprising several layers. The applique 10 is shown adhered to a primer or anti-corrosive coating 17 on an aircraft skin or outer structure 18. The applique 10 comprises a base film 12 having first and second sides. One side of the base film 12 comprises an adhesive layer 11 disposed to contact the primer or anti-corrosive coating 17. The other side of the base film 12 is positioned adjacent to particulate-filled ablative layers 13 and 14. A highly reflective layer 15 is positioned between the base film 12 and the ablative layer 13. FIG. 1 further shows a reactive, or fuse layer 19 positioned between the ablative layer 13 and ablative layer 14. It is understood that, in an applique having more ablative layers, more reactive fuse layers may be present between ablative layers or located elsewhere in the applique. Conversely, a single ablative layer and single fuse layer may be used. Ablative layers 13 and 14 are shown covered by a top coat 16.

Figure 2:
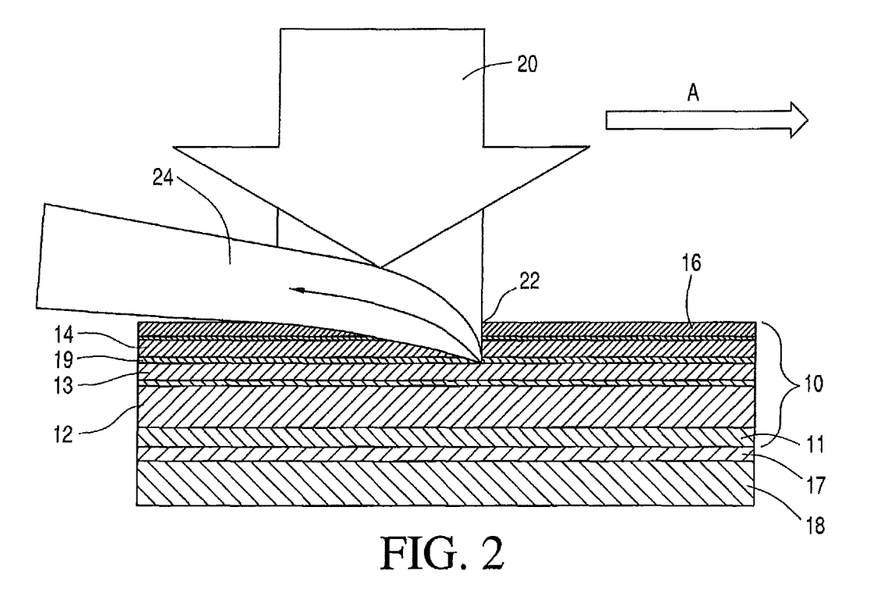
FIGS. 2 and 3 are diagrams showing the pre-determined release of ablative materials from an ablative layer in response to incident energy.
Figure 3:
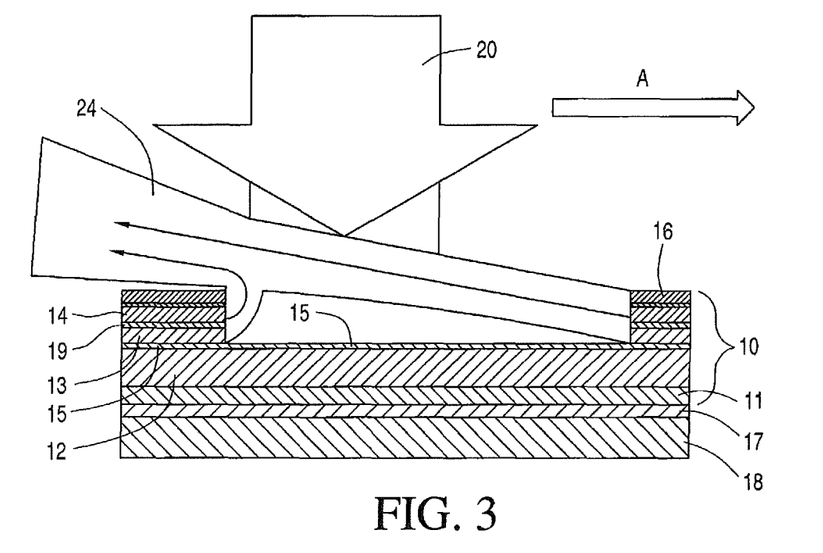

According to one preferred aspect, as shown in FIGS. 2 and 3, when the appliques shown in FIG. 1 receive and sense incident directed energy (e.g. laser beam), a signal is generated by the active electronic sensors and sent to a triggering mechanism to trigger the release of particulate from the ablative layers of the appliques. More specifically, as shown in FIG. 2 an incident high power laser beam 20 impacts the surface of the protective applique 10 positioned on an aircraft skin or outer structure 18 (and its primer layer 17) at a region of incident attack 22. Arrow "A" denotes the direction of flight for the aircraft under radiation attack. As the incident radiation is sensed, ablative material 24 is released from ablative layers 13 and 14 and through top coat 16.

FIG. 3 shows a further aspect where the receiving and sensing of a high power laser beam 20 generates a signal to a activate a triggering mechanism to trigger the release of ablative material 24 from ablative layers 13 and 14 through top coat 16 not only at the region of incident attack 22, but also upstream of the region of incident attack 22. Arrow "A" denotes the direction of flight for the aircraft under radiation attack. As the ablative material 24 is emitted from the ablative layers 13 and 14 of the applique 10, reflective layer 15 may be substantially simultaneously partially exposed to portions of the incident high power laser beam 20 able to pass through the particulate screen formed by the emitted ablative material 24. The upstream release of screening particulates of ablated material is preferably accomplished by a chemical or thermal reaction initiated on a region preferably located upstream from the upstream edge of the point at which the laser impacts the applique surface. The reaction and release of the ablative material is triggered in a manner similar to an explosive fuse, with the reaction front progressing upstream and downstream of the point of impact as desired. The released stream of particulates thereby forms a particulate "screen" of ablative material that effectively covers and protects the region of laser impingement.

Figure 4:
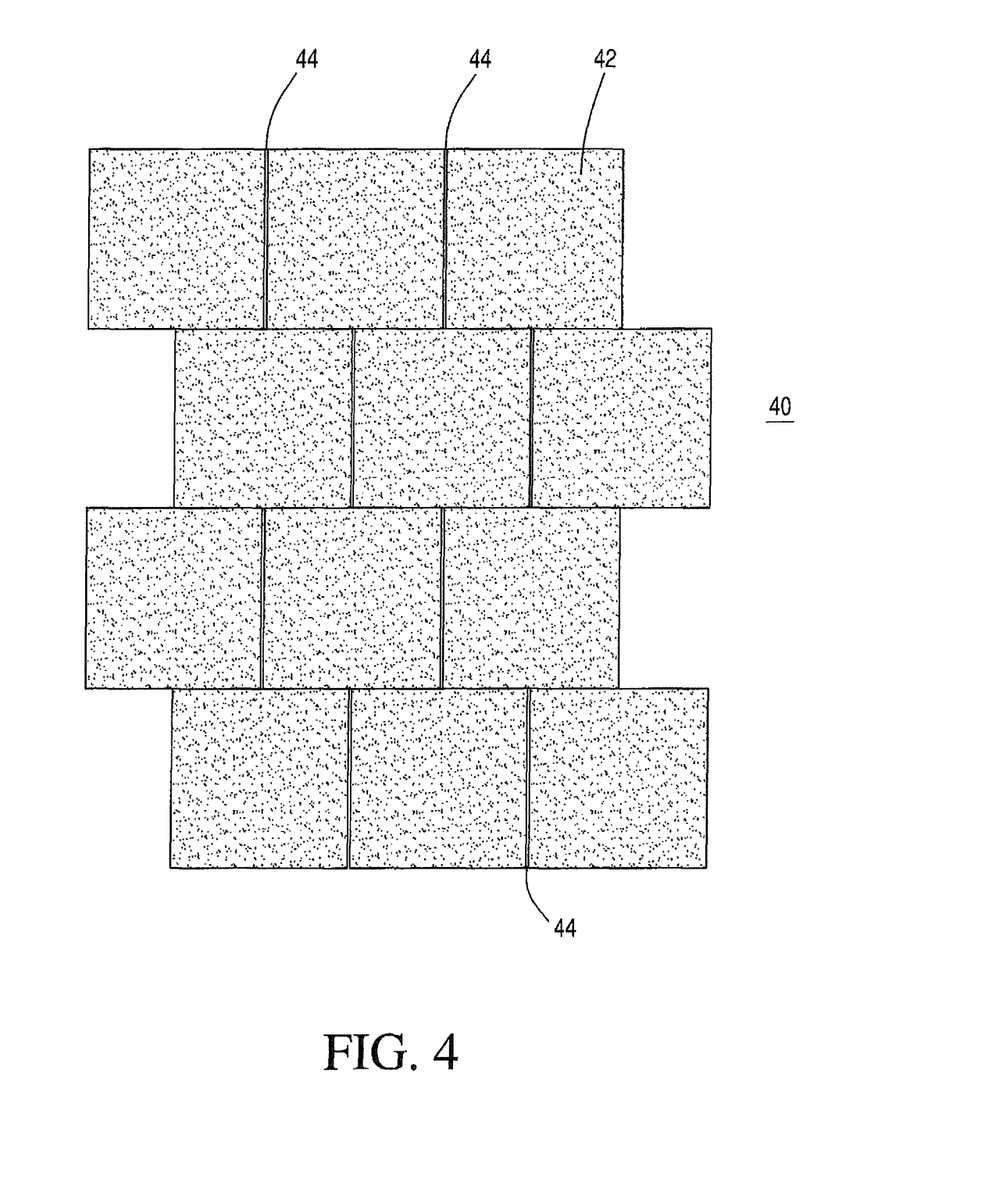
FIG. 4 is a schematic drawing of one variation showing appliques applied in a staggered array.

FIG. 4 shows an array 40 of the appliques 42 according to one aspect of the present disclosure. The appliques 42 are positioned onto a structure surface. Reaction zone "breaks" 44 occur at predetermined intervals throughout the appliques, such as, for example, every 5 cm, and also occur between the appliques 42. Such reaction zone "breaks" are designed to impede a reaction from extending beyond a desired zone in response to incident energy striking the surface of the appliques. The incorporation of "firebreaks" into the reactive ablative layers serves to effectively segment the activation and release of ablative material, thus insuring against the inadvertent activation and release of material outside of the critical region of the aircraft or structure under energy attack. The specific design for the size and spacing of the "firebreaks" is dependent only on the particular aircraft, vehicle, or stationary structure employing the systems, methods and apparatuses of the present disclosure, and should take into account vehicle design, velocity, expected ambient conditions, as well as the specifics of the reactive (and in the case of nano-ablative materials, the nano-thermite) layer(s). Effective "firebreaks" may comprise a predetermined gap in the reactive layer, a built-in fuse layer, or other design as necessary to prevent inadvertent release of incident energy-dissipating material, etc. Without being bound to any particular theory, it is thought that the design of the "firebreaks" will likely be narrower along the forward edge of the applique compared to sides of the appliques due to the effective cooling provided by the vehicle velocity and airflow. One preferred configuration is a set of narrow stripes or strips that are preferably aligned with the airstream direction. Stripes of finite length in concert with non-aligned and varying start-and-stop points may be used to prevent the activation and ignition of the incident energy-dissipating material from spreading, for example, in a direction transverse to the airstream direction, and thus limit the spread of reactive material release upstream and downstream of the point of incident directed energy (and therefore initial material activation).

Figure 5:
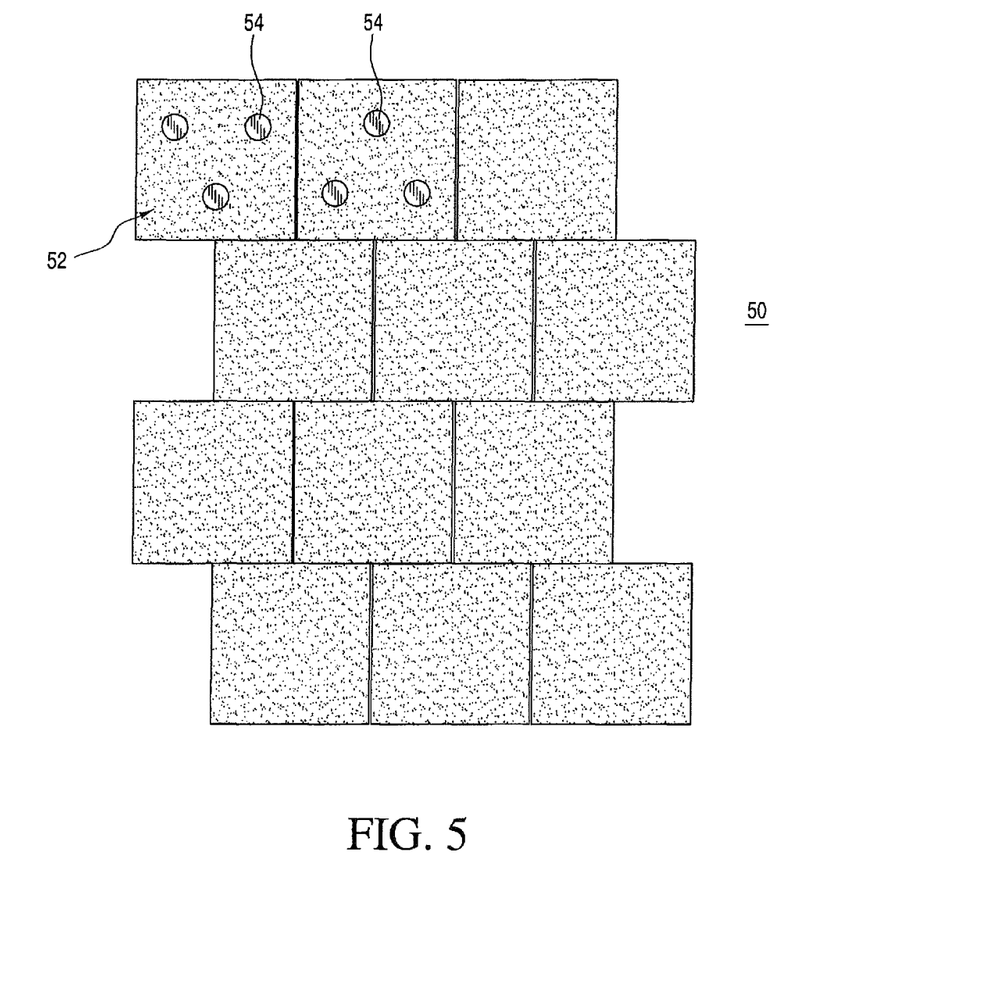
FIG. 5 is a schematic drawing of the appliques of FIG. 4 showing sensing triggers.

FIG. 5 shows the array 50 of the appliques 52 comprising sensing triggers 54 distributed in a predetermined configuration across and throughout the applique surfaces. The sensor triggers 54 may be distributed in a continuous or discontinuous layer throughout the appliques.

Figure 6:
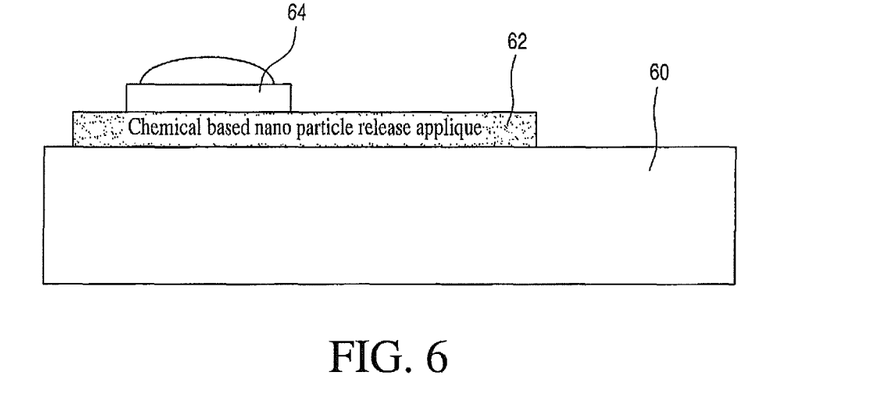
FIG. 6 is a cross-sectional view of a schematic representation of one variation showing a trigger pod in communication with an applique containing incident energy-dissipating material.

FIG. 6 shows a cross-sectional view of a schematic representation of one aspect of the present disclosure showing a triggering mechanism in communication with an applique containing incident energy-dissipating material, such as a chemical-based nano-particle reactive layer. An applique 62 containing nano-particulate material is shown applied to substrate 60. A trigger pod 64 is shown in contact with applique 62. Each trigger pod can be calibrated to sense different directed energy wavelengths and intensity, and each may be heat or chemical-based, or heat or electronic-based. The trigger pods can be charged prior to each mission, or continuously charged for readiness in the case of a stationary structure. The trigger pods can also incorporate a small transmitter (not shown) to inform a pilot or remotely-located monitoring command of an event, such as 1) sensing a directed energy attack, and 2) the immediate need to initiate evasive maneuvers and/or release a predetermined amount of particles from another location upstream or downstream from the incident location of the directed energy attack. Energy harvesting options to activate the trigger pods include electrostatics, solar, chemical, electrical, vibration or acoustic (piezo), airflow, or combinations thereof.

Figure 7:
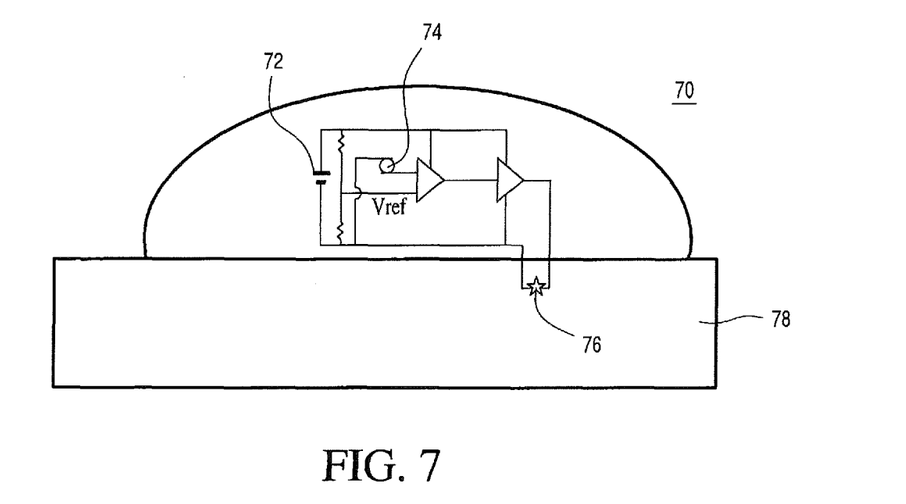
FIG. 7 is a cross-sectional view of a schematic representation of one variation showing a heat or electronic-based trigger pod in communication with an applique containing incident energy-dissipating material.

FIG. 7 shows an enlarged cross-sectional view of a heat or electronic trigger pod 70 useful in one aspect. A power supply shown as a lithium battery or super-capacitor 72 powers a circuit having a thermocouple 74 in communication with a burn wire or charge 76 present in a reactive layer 78 comprising a reactive material, such as, for example a nano-thermite. The reactive material in the reactive layer 78 is ignitable by the burn wire or charge 76. Electronic trigger pods can be charged and applied to a substrate surface prior to a mission, or can be maintained in state or perpetual readiness, for example, on a stationary structure. The electronic trigger pods can incorporate a small transmitter (not shown) to inform a pilot or remotely-located monitoring command of an event, such as 1) sensing a directed energy attack, and 2) the immediate need to initiate evasive maneuvers and/or release a predetermined amount of particles from another location upstream or downstream from the incident location of the directed energy attack.

Figure 8:
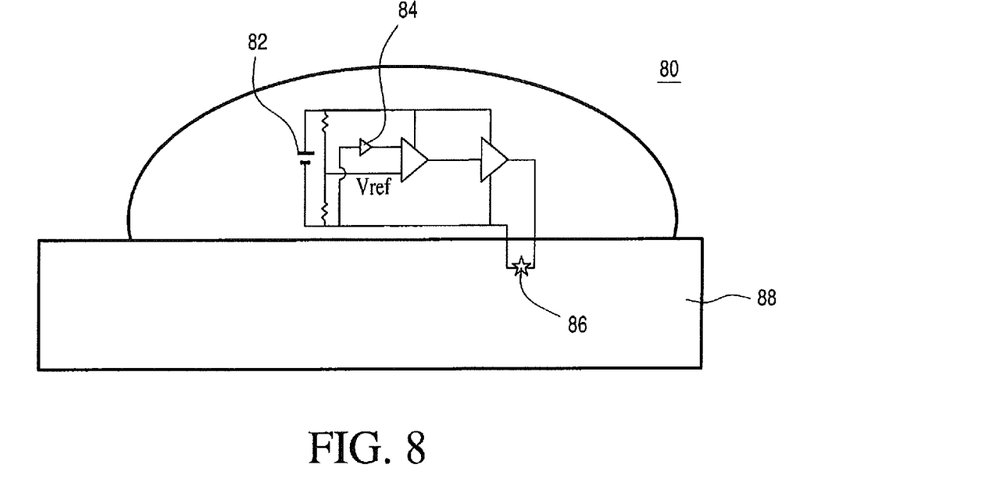
FIG. 8 is a cross-sectional view of a schematic representation of one variation showing an optical or electronic-based trigger pod in communication with an applique containing incident energy-dissipating material.

FIG. 8 shows an enlarged cross-sectional view of a trigger pod 80 useful in another aspect. In this configuration, the power source is a lithium battery or super-capacitor 82 powering a circuit comprising a photodiode with an optical filter 84. Upon receiving a signal to fire, current is sent to the burn wire or charge 86 located in contact with a reactive material, such as, for example, a nano-thermite located in the reactive layer 88. Each trigger pod can be calibrated for different directed energy threats through selection of the photodiode and the optical filter and can be tailored to the vulnerability of a specific location by setting Vref. Electronic trigger pods can be charged and applied to a substrate surface prior to a mission, e.g. via a sheet of adhesive backed pods on a non-contact charger pad. As with other aspects, the electronic trigger pods can incorporate a small transmitter (not shown) to inform a pilot or remotely-located monitoring command of an event, such as 1) sensing a directed energy attack, and 2) the need to immediately initiate evasive maneuvers and/or release a predetermined amount of particles from another location upstream or downstream from the incident location of the directed energy attack.

Figure 9:
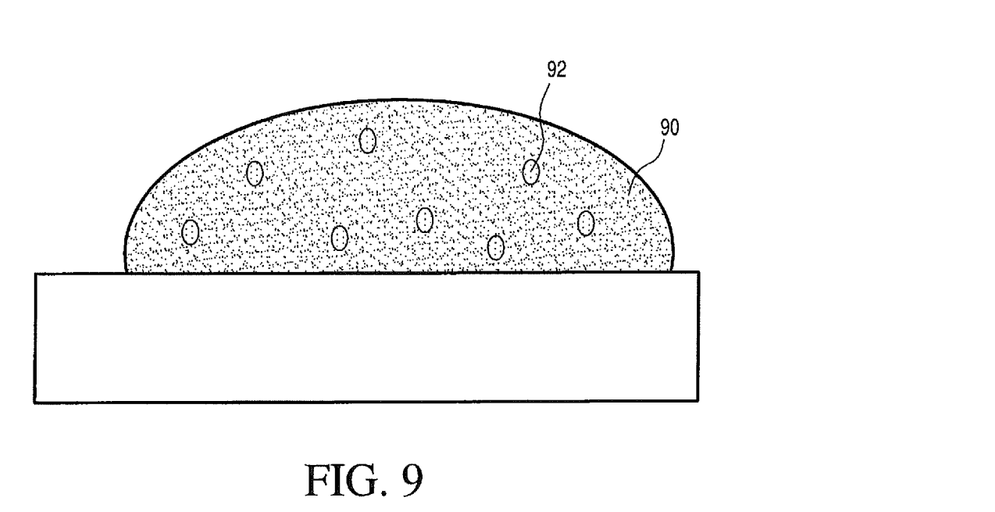
FIG. 9 is a cross-sectional view of a schematic representation of one variation showing a heat or chemical trigger pod in communication with an applique containing incident energy-dissipating material.

FIG. 9 is a cross-sectional view of a schematic representation of another aspect showing heat or chemical trigger pods. As shown, trigger pod 90 incorporates a nano-thermite charge or other agent, such as, for example, a sodium azide 92. The heat or chemical trigger pods can be applied prior to a mission and may be tailored to a given heat load by adjusting the size or percentage of the nano-thermite (or other agent) in a heat-dissipating matrix.

Figure 10:
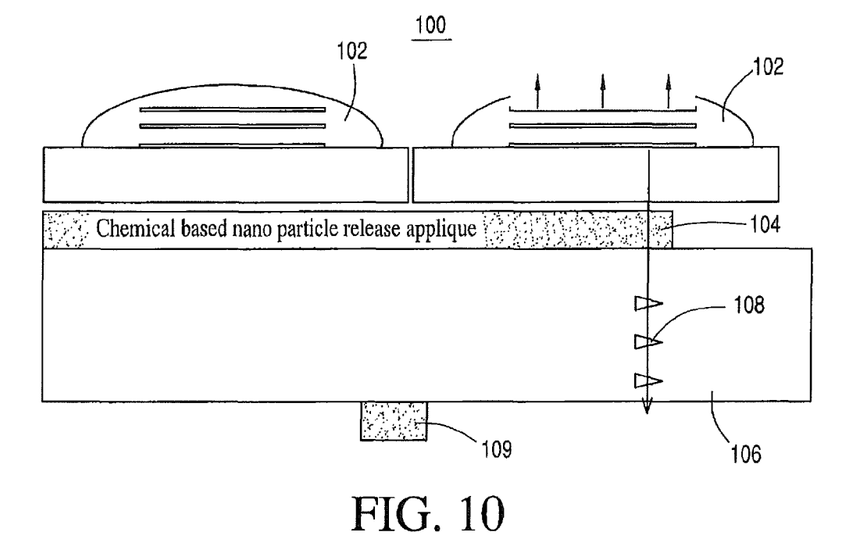
FIG. 10 is a cross-sectional view of a schematic representation of one variation showing multiple appliques (with heat or chemical trigger pods calibrated to produce, for example, ultrasonic frequency) applied to a substrate surface to be protected from incident energy attack.
Figure 11:
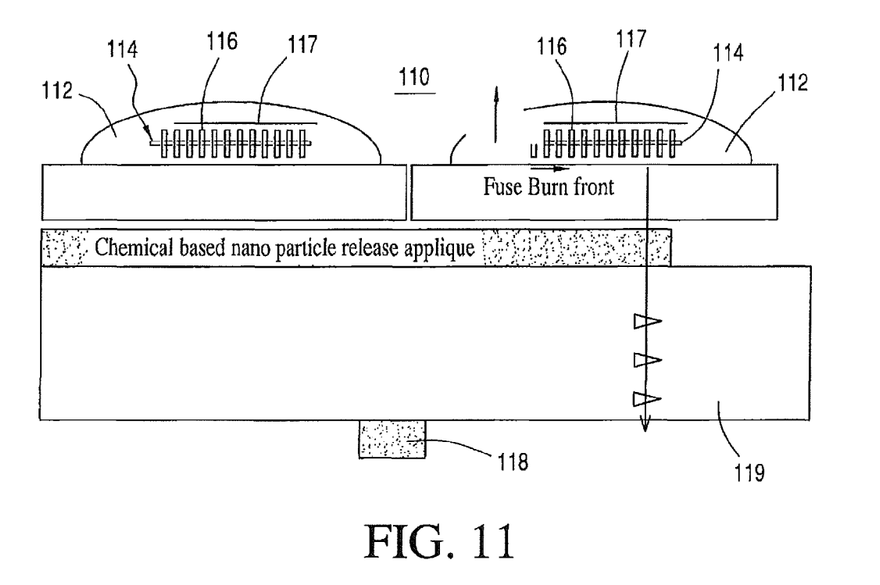
FIG. 11 is a cross-sectional view of a schematic representation of one aspect shown in FIG. 10, showing fuse array in the trigger pod.

FIGS. 10 and 11 are cross-sectional schematic views of trigger pods incorporated onto an applique layer comprising a material for release upon triggering in response to an incident directed energy attack. FIG. 10 shows one aspect for notifying a pilot or command operator located remotely from the structure of when such structure, aircraft vehicle, etc. is under a directed energy attack. As shown, a directed energy threat detection system 100 comprises heat or chemical trigger pods 102 affixed to a chemical-based release layer 104 covering a substrate surface 106 to be protected. The trigger pods 102 can be positioned relative to one another such that the spacing provides a frequency in a tone burst 108 as the trigger pods activate in series. The tone burst is detected by a tuned receiver, microphone or piezo crystal 109 (shown positioned on the inner surface of the substrate being protected). It is believed that the tone burst can be tailored to be distinctive from background noise, thus obviating the need to tuning to a precise frequency. Upon receiving the tone burst, a signal is sent notifying an operator or computer of the imminent threat.

FIG. 11 shows a directed energy threat notification system 110 contemplated by the present disclosure. As shown trigger pods 112 can be calibrated to produce a specific ultrasound frequency by lateral spacing changes. An electronic fuse 114 extends through an array of azide charges 116. The slow burning fuse connects neighboring charges and the spacing between the charges and the rate of the burn fuse provides the "frequency" in a tone burst as the trigger pod activates one charge after another. A shield 117 may be incorporated into the trigger pods to protect the charges from direct exposure to the directed energy threat that could otherwise prematurely activate the charges. A tuned receiver or microphone or piezo crystal 118 located on the inner surface of the structure being protected 119 receives the ultrasonic tone burst and sends a signal notifying an operator or computer of the imminent threat. It is believed that the tone burst can be tailored to be distinctive from background noise, thus obviating the need to tuning to a precise frequency. The arrow shows the release of expanded gas from the activation of the azide charges.

Figure 12:
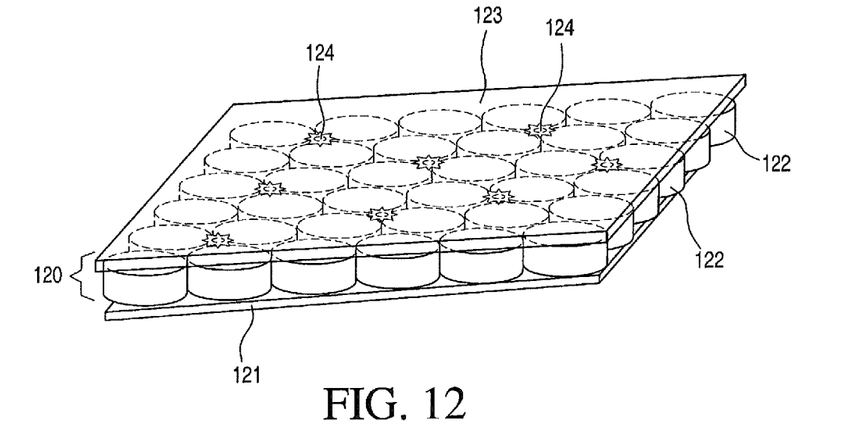
FIGS. 12 and 13 are schematic representations of containers or canisters comprising energy-dissipating material.
Figure 13:
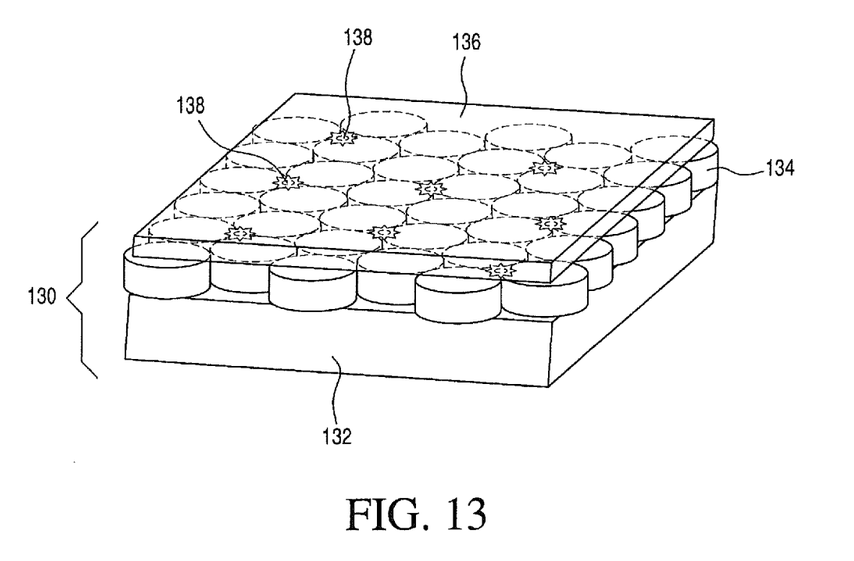

Some energy-dissipative materials may be best contained in pressurized canisters for fast deployment. These may be distributed throughout the structure and individually triggered "open" under computer control as guided by embedded sensors. Alternatively, such energy-dissipative materials can also be centralized into a few or even one canister(s) such as shown in FIGS. 12 and 13, and as described below. In the "single canister" mode, the underlying structure can be this energy-dissipative material canister. The protection layer would then consist of the triggered valves that open and deploy the energy dissipative material at a local area in a controlled fashion as needed; e.g. as guided by embedded sensors. In either case, the means of sensor readout and triggered control may be conducted in many ways; e.g. via electrical wires, RF interrogation and signaling, fiber optics, etc.

FIGS. 12 and 13 therefore show aspects of the disclosure, whereby the reactive enclosures are in the form of recessed containers or canisters that are activated via a triggering mechanism in communication with the sensing layers to release incident energy-dissipating material therefrom. As shown in FIG. 12, a coating 120 is positioned on an underlying layer 121. The coating 120 comprises a series of canisters 122 with triggered valves, and a sensing layer 123 having embedded sensors 124 in communication with the canisters 122. The canisters 122 contain amounts of incident energy-dissipating material.

FIG. 13 shows a variation of the structure shown in FIG. 12. In FIG. 13, a coating 130 comprises a larger enclosure 132 (shown as a rectangle, but it may be any shape as desirable) that contains the incident energy-dissipating material. The circular canisters 134 in this variation act as triggered valves through which the incident energy-dissipating material is released. The coating 130 comprises a sensing layer 136 having embedded sensors 138 in communication with the circular canisters 134.

It is further understood, that the present disclosure contemplates defensive mechanisms whereby enclosures containing incident energy-dissipating material may not only activate or release the energy-dissipating material when triggered, but the enclosures themselves may be released, in whole or in part, from the underlying structure surface in a predetermined fashion. According to this aspect, the enclosure, in whole or in part, may disengage from the structure surface to a predetermined distance away from the structure surface prior to itself activating or releasing amounts of incident energy-releasing material.

Figure 14:
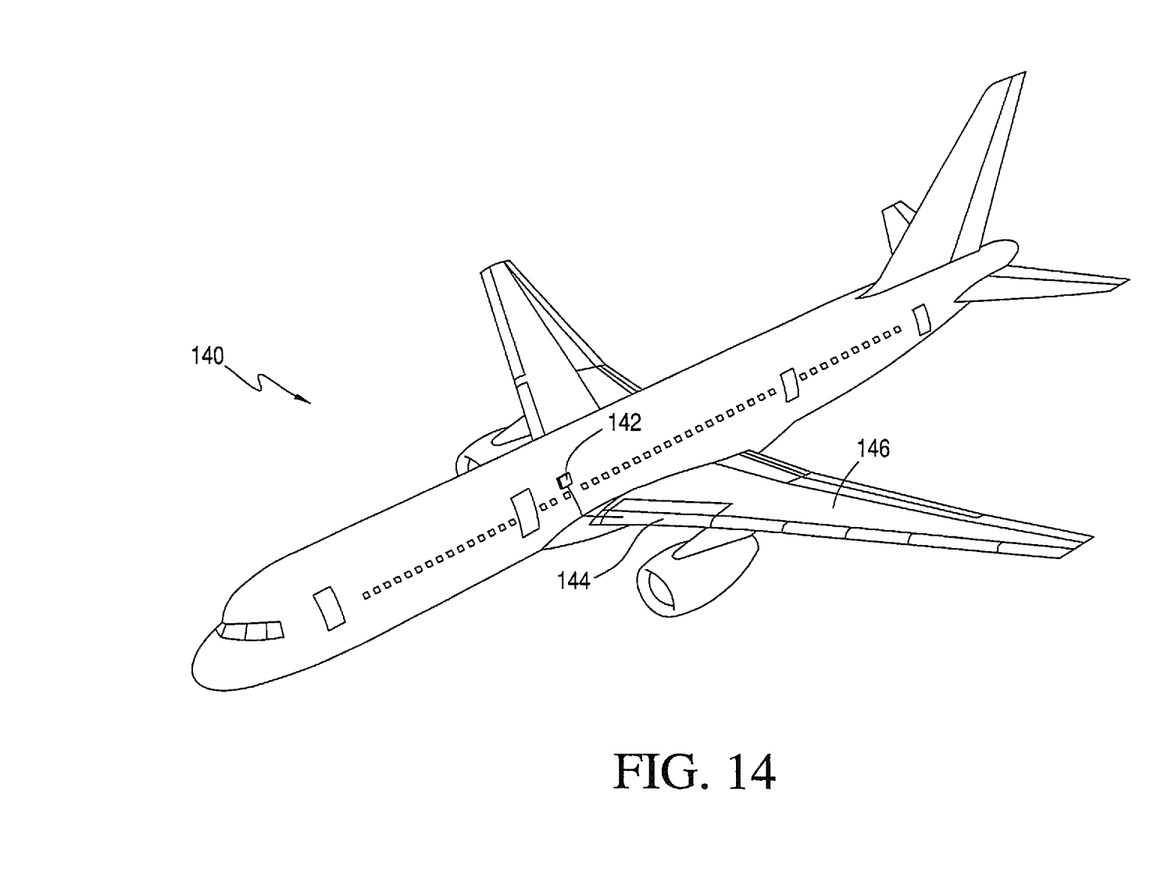
FIG. 14 is a drawing showing an aircraft comprising the apparatuses, methods and systems of the present disclosure applied to various aircraft surfaces.

FIG. 14 shows an aircraft comprising the apparatuses, methods and systems disclosed herein. Aircraft 140 comprises fuselage, and wing sections. A section of coating according to the disclosure is shown as fuselage coating 142, and wing coating 144. It is understood that entire sections of the aircraft may be coated, such as an entire wing 146.

In a preferred aspect, the reactive incident energy-dissipating layers are resistant to inadvertent and unintentional ignition and release, and, for example, when ablative materials are present, the ablative materials are designed to only be actively triggered for release from the applique film upon receiving signaling from active electronic sensors that incident high energy has impacted the applique at the structure surface. In a further aspect, for a flying aircraft, substantial airflow may be required to initiate and or sustain the chemical or thermal reaction in the ablative layers.

The thicknesses of the layers to be used in the applique, as well as the overall thickness of the applique itself is limited only by the practical considerations imposed by (e.g. super- and sub-sonic flight speeds on) the adherence capabilities of appliques having a certain thickness and weight. The layer thickness constraints will therefore impose requirements as to the materials useful in the incident energy-dissipating layers to create a useful particulate "screen". For example, assuming an aircraft speed of 500 km/hour and an incident laser spot diameter of 10 cm, the area of the particulate screen released into the air during a 3 second protection period would be 41.7 $m^2$. Assuming a 250 µm (~10 mil) ablative layer thickness, a particulate fill factor of 50% and a combined contributing area (laser spot area plus upstream area) of 0.1 $m^2$, the implied average effective particulate screen thickness is 300 nm. This example assumes substantially uniform coverage and 100% opacity. A greater number of particulates in the release is desirable given the possibility of an uneven distribution. A particulate size ranging from about 10 nm to about 3,000 nm is preferred, with a 10× increase in the number of particles.

According to one aspect, a further preferred geometry takes the form of a flake having a thickness ranging from about 10 nm and 500 nm, with a length ranging from about 400 nm up to 100 µm or more, more preferably ranging from about 3 µm to about 20 µm. A prime consideration is that the lateral dimension should substantially exceed the wavelength of the incident light on the applique surface. In other words, in one aspect of the disclosure, the particles may be on the nano-scale in one dimension and on the non-nano scale in another dimension, such as the dimension transverse to the nano-scale dimension. Toward that desired end, the preferred aspect ratio for the preferred particles ranges from about 20 to about 100.

Therefore, it is understood that nano-particles, by definition, have particle dimensions smaller than the wavelength of light. However, according to the present disclosure, nano-particles may be used as incident energy-dissipating particles based on their behavior as particles released to a particle cloud. However, the present disclosure also contemplates the use of larger particles (non-nano-particles including: micro-particles having a size ranging from about 1 µm up to about 1 mm, and macro-particles having a size larger than about 1 mm) whose dimensions more closely match or exceed that of incident directed energy wavelengths.

The matching of the dimensions to the incident directed energy wavelengths is thought to enhance energy-dissipative effect. Therefore, small structures that have a size approximately equivalent to (and preferably exceeding) incident directed energy wavelengths can be fabricated, and are thought to have the greatest scattering cross-section for a specific wavelength. Therefore, small structures of any geometric shape that have a size across any aspect of its geometry that is approximately equivalent to incident directed energy wavelengths are contemplated by the present disclosure. According to one preferred aspect of the disclosure, small structures are contemplated having a thickness in the nano-scale region and an aspect ratio ranging from about 20 to about 100.

In addition, a "glitter-bomb" comprising small segments of flat metallic reflective particles could also be used according to the present disclosure. Such particles would lie flat within the appliques, but once released would tend to "peel" out into the airstream. In addition to the energy-dissipative characteristics of the particles used, reflective particles may be fabricated from layered polymers of differing refractive indices to create wavelength specific reflectors. Reflective particles fabricated using photolithographic methods that can be sized at approximately 10 µm or larger, and may be small cube corner particles (e.g. mirrored particles) that can direct energy away from the target and back toward the threat origin.

Therefore, while aspects of the present disclosure further contemplate the use of nano-particles in an ablative or non-ablative incident energy-dissipating material, it is understood that other ablative materials will be useful in the apparatuses, systems and methods of the present disclosure, including micro-corner cubes, glitter fabricated from metal coatings, holographic coatings, etc. When non-nano-ablative particles are used, it is further understood that the appliques containing such ablative layers may be thicker than the appliques containing the nano-ablative materials.

One goal of the appliques and incident energy-dissipating material release coatings, systems and methods of the present disclosure is to divert and dissipate incident laser energy away from a target, e.g. an aircraft, vehicle, or stationary structure, or to diffuse the incident energy adequately and to such an extent that the incident energy level falls below a damage threshold.

A further preferred aspect contemplates the incorporation of quantum dots as additional absorbers into, for example, the nano-ablative material matrix. Quantum dots possess the desirable characteristic of splitting absorbed energy between thermal and re-radiated optical energy having a narrow waveband. Conceivably, coatings optimized for reflection in such wavebands would effectively reject re-emitted light. Quantum dots can be designed to absorb over a specific range, and emit over another specific range of wavelengths.

According to a preferred aspect, the ablative matrix comprises the particles that will form a particulate screen, and the ablative layers preferably release the particles in a steady, substantially uniform manner under high power laser illumination. The ablative particle release and associated disintegration of the ablative matrix preferably occurs at a temperature that will not cause excessive heating of the applique base film, adhesive, primer or aircraft surface. According to one preferred variation, molybdenum disulfide ($MoS_2$) is incorporated in substantial amounts (ranging from about 10 to about 90 weight percent of the applique base film) into the ablative matrix. Molybdenum disulfide sublimes at about 450° C. and will facilitate disintegration of the ablative matrix at or above such temperature. In another aspect, sodium hydrate or cross-linked polyethylene will be appropriate at temperatures ranging from about 70 to 100° C.

According to further preferred aspects, one or more reactive layers are incorporated into the applique layered matrix, and are preferably located within the ablative layer matrix. The reactive layers are responsible for regulating the release of the ablative material from the ablative layers, preferably from the point on the aircraft, spacecraft or other vehicle, etc., at about the upstream edge of an incident laser beam and extending to points upstream as desired, as well as regions downstream from an incident laser beam as desired. The reactive layer is actively triggered by a signal from an active electronic sensor. The reactive layer is therefore capable of substantially simultaneous ignition by the incident laser beam. The reactive layers must also be highly resistant to unintentional or inadvertent ignition, such as by mechanical or other means. For example, for a fast moving, sub-sonic aircraft, the reaction front may initiate upstream at a rate of about one foot per second in order to release enough particulate material to provide adequate laser protection.

The reaction temperature and energy that is released should be sufficient to cause the disintegration of the ablative matrix, but low enough to minimize heat flow to the base film and aircraft surface. One preferred reactive material contemplated for incorporation into the reactive layer(s) is a nano-thermite-containing material, which offers substantial design freedom relative to burn rate, temperature, or reaction and released energy density. Nano-thermite materials are a combination of nano-particulate metal (fuel) and oxidizers. Other materials can be combined with the nano-thermite to achieve a desired burn rate. A nano-thermite or "super-thermite" is understood to be a metastable intermolecular composite (MIC) characterized by a particle size of its main constituents, a metal and a metal oxide, under 100 nm. This allows for high and customizable reaction rates. Nano-thermites comprise an oxidizer and a reducing agent that are intimately mixed on the nanometer scale. Preferred thermites include: aluminum-molybdenum(VI) oxide; aluminum-copper(II) oxide; aluminum-iron(II,III) oxide; antimony-potassium permanganate; aluminum-potassium permanganate; aluminum-bismuth(III) oxide; aluminum-tungsten(VI) oxide hydrate; aluminum-fluoropolymer; titanium-boron (burns to titanium diboride), etc.; with an aluminum iron oxide being particularly preferred.

It is further understood that aspects of the present disclosure contemplate appliques for slow moving or even static potential targets. It is understood that for such slower moving targets, the reaction front may be designed to advance more slowly for the purpose of producing a longer-lasting, billowing-type cloud for effective laser protection.

The base film of the applique acts as a primary structural component of the applique system, and preferably provides an environmental barrier for the aircraft surface and any primer or corrosion coating that is placed onto the aircraft surface. On one side, the base film preferably comprises an adhesive layer that affixes the applique to the structure to be protected (e.g. an airframe, etc.). On the other side, the base film preferably comprises a reflective layer, followed by the ablative layer(s). According to a further variation, the base film has a very low thermal conductivity and a high maximum use temperature, for example, in excess of about 800° K. Polyimide films such as poly(vinylfluoride), Kapton (DuPont), Vespel (DuPont) are preferred, with poly(vinylfluoride) being particularly preferred. These base films may be continuous or non-continuous films or may be woven or braided layers.

The adhesives used to secure the applique system to a structure preferably possess characteristics so as not to be degraded by exposure to various fluids, such as, for example, fuel, hydraulic fluid, etc. The preferred adhesives are highly resistant to the intrusion of corrosive fluids, such as, for example, salt water, etc., into the region between the applique and the primer or coating on the structure. Suitable preferred adhesive comprise 3M 9086, SM 9088 and combinations thereof, with 3M 9088 being particularly preferred.

The outer top coat layer of the applique system preferably meets the required characteristics met by the outer surface of the structure itself, including, color, spectral reflectivity and gloss, etc., since such characteristics govern the overall outer appearance of the structure being protected by the applique, (e.g. aircraft, spacecraft, vehicle, stationary structure etc.). Standard top coat paints may be used on preferred applique systems. According to one variation, the incident energy-dissipating material is protected from external weathering conditions by a protective surface that is preferably metallic, and that is a lightweight, high heat-conducting material, e.g. aluminum, silver, gold, titanium nitride, titanium carbide, etc.

Selection of the coating material is important to avoid known ablative problems, e.g. the unintended trapping of sub-layer gas pockets that could lead to micro-explosions fracturing the applique. According to a preferred aspect of the present disclosure, an ablative matrix coated with a metallic surface protects the integrity of the applique and further supplies added reflectivity of the surface against threshold and sub-threshold high energy attacks on the surface. In addition, a reflective metallic coating provides some lateral conduction and dissipation of heat away from an area of the surface under "attack". Therefore, according to preferred aspects, the applique system comprises an outer environmental barrier that the final top coat layer will be applied to. The environmental barrier preferably comprises a material comprising an anti-corrosive paint, a polyurethane, a water-proof plastic barrier, a thin polymer film, such as aluminized mylar, etc. and combinations thereof, with a polymer film being particularly preferred.

According to another aspect, when the incident energy-dissipating material/layer is an ablative layer, such a layer preferably comprises nano-particles and/or quantum dot-laden dust in an ablative matrix. Without being bound to any particular theory, it is believed that the nano-particle-laden dust creates or assists in creating a maximally absorbing protective boundary layer above a substrate to which the applique (containing the ablative layer) is attached.

The known attempts at affording structures protection against directed energy attack have been generally bulky, heavy, added structures to a surface. The present disclosure therefore contemplates useful ablative layers that reach a sufficiently high temperature "burn off" of a surface and, in this way, carry energy away (dissipate the energy) from the structure and provide a plume of protection above and away from the structure. Added thickness is required to ensure that heat conduction doesn't impact the underlying structure, and to ensure that enough material is available at all locations to stand off attack. According to the present disclosure, the need for excessively thick and heavy coatings is mitigated by also triggering neighboring ablative protection regions upstream of a target area, and using the airstream to direct this added protection into the region requiring protection. This allows added protection time while a pilot, with respect to an air vehicle, executes evasive maneuvers away from a directed high energy attack.

According to the present disclosure, the need for thick and heavy coatings is mitigated by also triggering neighboring ablative protection upstream of a target area and using the airstream to pull this added protection into the region requiring protection. This gives added protection time while a pilot, with respect to an air vehicle, executes evasive maneuvers away from a directed high energy attack.

Although most examples here have discussed the use of the applique systems on aircraft, spacecraft, and stationary structures requiring protection from incident high energy attack, the apparatuses, systems and methods set forth herein are contemplated for use with manned or unmanned vehicles or objects of any type or in any field of operation in a terrestrial and/or non-terrestrial setting. A non-exhaustive list of contemplated structures include manned and unmanned aircraft, spacecraft, satellites, terrestrial, non-terrestrial and surface and sub-surface water-borne vehicles, etc.

While the preferred variations and alternatives of the present disclosure have been illustrated and described, it will be appreciated that various changes and substitutions can be made herein without departing from the spirit and scope of the disclosure. When introducing elements of the present invention or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this invention has been described with respect to specific embodiments, the details of these embodiments are not to be construed as limitations.

What is claimed is:

1. A method for protecting a structure against damage from incident directed energy comprising:
   locating a coating at predetermined locations on a structure surface, the coating comprising a sensing layer comprising an active electronic sensor, and an enclosure, said enclosure further comprising a contained amount of an incident energy-dissipating material, the enclosure in communication with the sensing layer and a triggering mechanism;
   sensing incident directed energy at the sensing layer by the active electronic sensor, said active electronic sensor in communication with the triggering mechanism;
   activating the triggering mechanism;
   actively triggering an amount of the incident energy-dissipating material for release of the amount of incident energy-dissipating material from the enclosure at predetermined locations on the structure surface; and
   releasing the triggered amount of the incident energy-dissipating material from the enclosure to a predetermined distance away from the structure surface;
   wherein the incident directed energy does not contact the incident energy-dissipating material before release of the incident energy-dissipating material from the enclosure.

2. The method of claim 1, wherein the enclosure is selected from the group consisting of an applique, a container, a layer in the coating, and combinations thereof.

3. The method of claim 1, wherein the coating comprises the sensing layer, the triggering mechanism and the amount of incident energy-dissipating material.

4. The method of claim 1, wherein the enclosure comprises layers selected from the group consisting of: a reflective layer, a base layer, an adhesive layer, a top coat layer, and combinations thereof.

5. The method of claim 1, wherein the incident energy-dissipating material comprises components that are dimensioned to at least partially dissipate incident directed energy wavelengths.

6. The method of claim 1, wherein the incident energy-dissipating material comprises materials selected from the group consisting of: nano-particles, micro-particles, macro-particles, ablative particles, and combinations thereof.

7. The method of claim 1, wherein the enclosure is located remotely from a point of sensed incident direct energy on the structure surface.

8. The method of claim 1, wherein the structure is selected from the group consisting of a vehicle, an aircraft, and a stationary structure.

9. A system for protecting a structure against damage from incident directed energy, said system comprising:
   a coating applied to predetermined locations on a structure surface, said coating comprising a sensing layer, said sensing layer comprising and in communication with at least one sensor;
   at least one enclosure containing an amount of incident energy-dissipating material in the enclosure, said enclosure in communication with the sensing layer, and said enclosure located at predetermined locations on the structure surface; and a triggering mechanism in communication with the sensor and the enclosure, said triggering mechanism configured to activate the amount of incident energy-dissipating material within the enclosure at predetermined locations on the structure surface; wherein the amount of triggered incident energy-dissipating material is actively released from the enclosure to a predetermined distance away from the structure surface;

wherein the incident directed energy does not contact the incident energy-dissipating material before release of the incident energy-dissipating material from the enclosure.

10. The system of claim 9, wherein the enclosure is selected from the group consisting of: an applique, a container, and combinations thereof.

11. The system of claim 9, wherein the coating is applied to the structure surface as an applique.

12. The system of claim 9, wherein the coating comprises the sensing layer, the enclosure and the amount of incident energy-dissipating material.

13. The system of claim 9, wherein the enclosure comprises layers selected from the group consisting of: a top coat layer, a base layer, an adhesive layer, a reflective layer, and combinations thereof.

14. The system of claim 9, wherein the incident energy-dissipating material comprises material dimensioned to at least partially dissipate incident directed energy wavelengths.

15. The system of claim 9, wherein the incident energy-dissipating material comprises materials selected from the group consisting of: nano-particles, micro-particles, macro-particles, ablative particles, and combinations thereof.

16. The system of claim 9, wherein at least a portion of the enclosure releases from the structure prior to activating a predetermined amount of incident energy-dissipating material.

17. The system of claim 9 wherein the enclosure is located remotely from a point of incident direct energy on the structure surface.

18. The system of claim 9, wherein the structure is selected from the group consisting of: a vehicle, an aircraft, and a stationary structure.

* * * * *